(12) United States Patent
Hoogendoorn

(10) Patent No.: US 6,239,932 B1
(45) Date of Patent: May 29, 2001

(54) METHOD OF AND ARRANGEMENT FOR FORMATTING A MAGNETIZABLE MEDIUM

(75) Inventor: Abraham Hoogendoorn, Eindhoven (NL)

(73) Assignee: OnStream, Inc.

(*) Notice: Subject to any disclaimer, the term of this patent is extended or adjusted under 35 U.S.C. 154(b) by 0 days.

(21) Appl. No.: 09/175,245

(22) Filed: Oct. 20, 1998

(30) Foreign Application Priority Data

Oct. 30, 1997 (EP) .................................................. 97203363

(51) Int. Cl.[7] ............................. G11B 15/14; G11B 5/596

(52) U.S. Cl. ................................................. 360/64; 360/77.02

(58) Field of Search ............................... 360/46, 63, 66, 360/64, 77.02, 77.08, 48

(56) References Cited

U.S. PATENT DOCUMENTS

| | | | |
|---|---|---|---|
| 5,282,096 | * | 1/1994 | Morisaki et al. ...................... 360/64 |
| 5,375,020 | * | 12/1994 | Aggarwal et al. .................. 360/72.1 |

FOREIGN PATENT DOCUMENTS

WO 96/30897   10/1996  (WO) .

* cited by examiner

*Primary Examiner*—W. Chris Kim
*Assistant Examiner*—Regina Y. Neal
(74) *Attorney, Agent, or Firm*—Welsh & Katz, Ltd.

(57) ABSTRACT

An arrangement for recording servo signals on a magnetic tape has first and second adjoining write heads respectively driven by first and second write signals. Each write signal includes a servo signal and a bias signal, the bias signals being phase displaced periodic signals which result in the magnetic tape being magnetized alternately by the first and second write heads. This provides a sharp transition in the servo signals produced from adjoining servo tracks during read-out.

8 Claims, 4 Drawing Sheets

METHOD OF AND ARRANGEMENT FOR FORMATTING A MAGNETIZABLE MEDIUM

BACKGROUND OF THE INVENTION

The invention relates to a method of formatting a magnetizable medium, comprising the recording in one pass of at least a first servo signal in a first servo track by means of a first write head and a second servo signal in a second servo track, adjacent the first servo track, by means of a second write head.

The invention also relates to a magnetizable medium provided with at least a first servo track containing a first servo signal and a second servo track adjacent the first servo track and containing a second servo signal.

Furthermore, the invention relates to a cartridge comprising at least one reel hub on which a magnetic tape has been wound, which magnetic tape has been provided with at least a first servo track containing a first servo signal and a second servo track adjacent the first servo track and containing a second servo signal.

The invention also relates to an arrangement for formatting a magnetizable medium, comprising
  a write head unit comprising at least a first write head and a second write head disposed near the first write head,
  a mechanism for moving the medium and the write bead unit with respect to one another,
  a servo generator for driving the first write head with a first servo signal and for driving the second write head with a second servo signal.

DESCRIPTION OF THE RELATED ART

Such a method, such a medium, such a cartridge and such an arrangement are known from WO 96/30897-A2 (PHN 15250). In the known method a large number of servo tracks are written simultaneously on a magnetic tape by means of a write-head unit having a number of write heads which is the same as the number of tracks. The write-head unit then scans the magnetic tape in its longitudinal direction and the write heads adjoin one another in a direction transverse to said longitudinal direction. The write heads are then driven in such a manner that two adjacent servo tracks always contain a distinguishable servo signal. A magnetic tape thus provided with servo tracks is used in a multi-track linear data recording apparatus. The transitions between two adjacent servo tracks serve to position a recording/reproducing head in the data recording apparatus with respect to the medium. A disadvantage of the known method is that the transition between two adjacent servo tracks is not sharp. As a result of this, the data recording apparatus is not capable of accurately positioning the recording/reproducing head with respect to the medium.

SUMMARY OF THE INVENTION

It is an object of the invention to provide a method of the type defined in the opening paragraph which yields a sharper transition between two adjacent servo tracks than the known method.

The method in accordance with the invention is characterized in that during the pass the medium is magnetized alternately by the first write head and the second write head. The invention is based on the recognition of the fact that the magnetic fields of the first write head and the second write head can interfere with one another as a result of which, amplified by non-linear characteristics of the magnetizable medium, a reduced magnetization of the medium is obtained near the transition between two adjacent servo tracks. Owing to the measures in accordance with the invention it is achieved that the magnetic fields of the first write head and the second write head alternate with one another as a function of time during use. As a result of this, the magnetic fields of the first write head and the second write head influence one another to a relatively small degree and a better magnetization of the medium is obtained near the transition between the first and the second servo track. In the transitional area between the first and the second write head the magnetic field at a given instant is determined almost entirely by the first write head or by the second write head. As a result of this, the transitional area between two adjacent servo tracks is magnetized alternately in accordance with the first servo signal and the second servo signal and a sharp transition between the first servo track and the second servo track is obtained.

A variant of the method in accordance with the invention is characterized in that use is made of a frequency of alternation which is higher than, or substantially equal to, the highest frequency in the first servo signal and the second servo signal. Owing to this measure, the first and the second servo signal, also referred to as tracking signal, can subsequently be recovered more easily from the first and the second servo track by filtering.

A variant of the method in accordance with the invention is characterized in that use is made of a frequency of alternation which is higher than, or substantially equal to, the Nyquist frequency of the medium. Owing to this measure it is achieved that the alternation frequency is recorded on the medium in a strongly attenuated form so that it is no longer necessary to filter out the alternation frequency during the reconstruction of the first and the second servo signal. Moreover, this results in substantially the entire bandwidth of the medium being available for the first and the second servo signal.

A variant of the method in accordance with the invention employs phase displaced periodic bias signals for the respective write heads.

That achieves that the distortion of the first and the second servo signal caused by non-linearity of the magnetization curve of the medium is reduced and at the same time a satisfactory magnetization is obtained near the transition between the first and the second servo track.

The bias signals may include a periodic trivalent signal. That yields the advantage that the first and the second write head are operated efficiently.

By configuring the first and the second servo signals to have phase opposed sinusoidal components, the transition between the first and the second servo track can readily be tracked by means of a servo system. For recording such signals the method in accordance with the invention has a great many advantages because, when this is method is not used, the magnetic fields caused by the first sinusoidal component and the second sinusoidal component counteract one another to a maximal extent because they are in phase opposition.

The two write heads may have a common pole. That has the advantage that the first and the second servo track can be written very close to one another so that the medium can store a large amount of information. When such write beads are used the method in accordance with the invention has a great many advantages because saturation of the common pole is precluded by the alternate write method.

The two servo signals may be recorded alternately in odd and even numbered servo tracks. That has the advantage that the medium can be provided with all the required servo tracks in one pass, as is described in WO 96/30897-A2 (PHN 15250), which is herewith incorporated by reference, and that only two different servo signals and two different bias signals have to be generated.

The medium in accordance with the invention is characterized in that the first servo track contains a first bias signal and the second servo track contains a second bias signal, and the first bias signal and the second bias signal alternately assume their respective maximum value.

An advantage of the medium in accordance with the invention is that the transition between the first and the second servo track is sharp, so that the data recording apparatus is capable of accurately positioning the recording/reproducing head with respect to the medium. As a result of this accurate positioning the data can be written and read with a greater reliability. In addition, this accurate positioning enables the density of the data tracks to be higher than with the known system.

The cartridge in accordance with the invention is characterized in that the first servo track contains a first bias signal and the second servo track contains a second bias signal, and the first bias signal and the second bias signal alternately assume their respective maximum value.

The arrangement in accordance with the invention is characterized in that the arrangement comprises means for alternately magnetizing the medium with the first write head and the second write head during the movement of the medium and the write head with respect to one another. The arrangement is suitable for using the method in accordance with the invention.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 1:
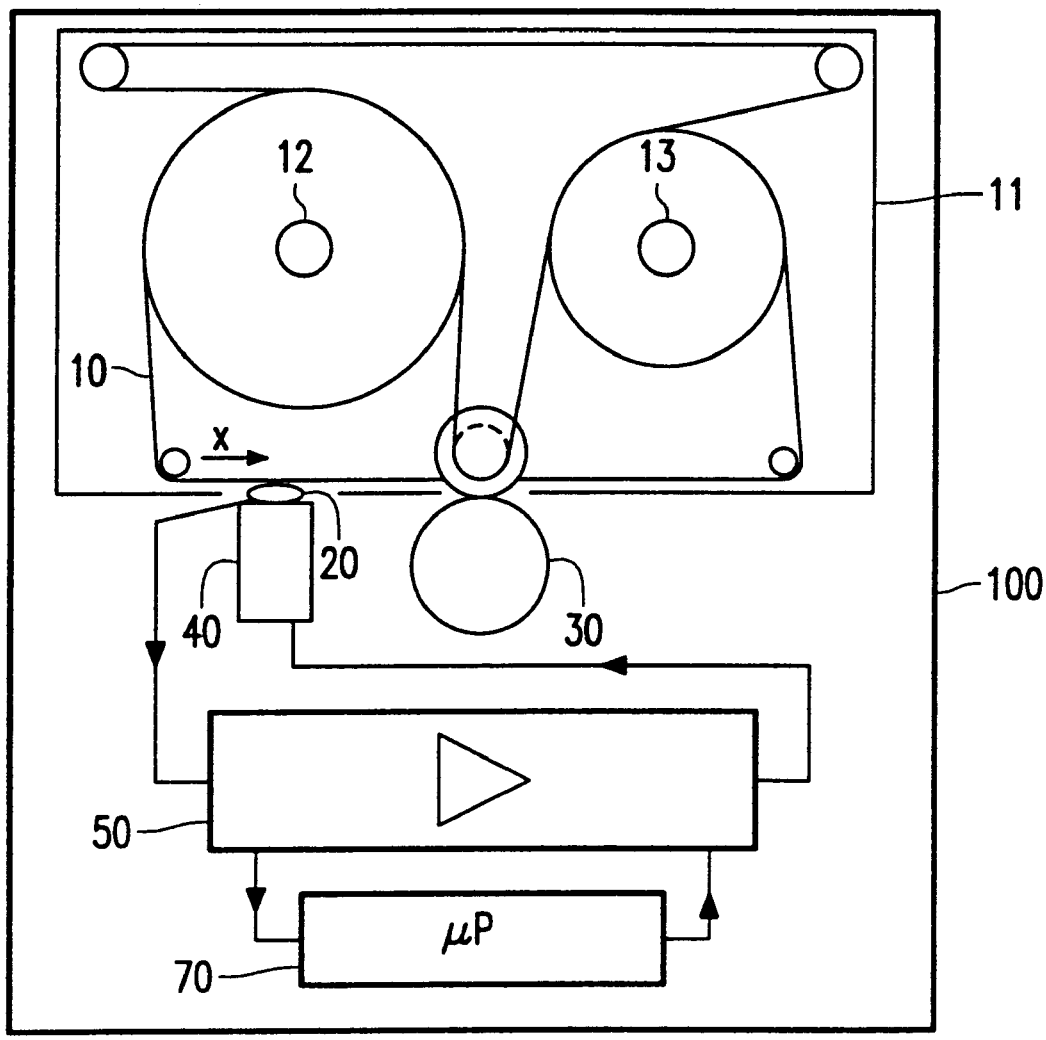
FIG. 1 is a diagrammatic representation of a system using the cartridge 11 and the medium 10 in accordance with the invention, FIG. 2 diagrammatically represents how the medium 10 is formatted and a magnetic-head unit 20 is positioned with respect to the medium.

FIG. 1 is a diagrammatic representation of a system in which the cartridge and the medium in accordance with the invention can be used. The system comprises an apparatus 100 and a magnetizable medium, in the present case a magnetic tape 10 wound on two reel hubs 12 and 13 in a housing of a cartridge 11. The magnetic tape 10 has been provided with a pattern of servo tracks ST1–ST5 which contain servo signals in the form of a magnetization pattern recorded at a deep level (see FIG. 2). These deep servo tracks are referred to as buried servo tracks. The apparatus 100 comprises a magnetic-head unit 20 and means, in the present case a motor 30, for realizing a relative movement of the magnetic tape 10 with respect to the magnetic-head unit 20 in a longitudinal direction x past the servo tracks (see FIG. 2). The apparatus 100 further comprises an actuator 40 for moving the magnetic-head unit 20 transversely to the servo tracks and a servo circuit 50 arranged between the magnetic-head unit 20 and the actuator 40. The apparatus 100 comprises control means, in the present case a microcomputer 70, for controlling the actuator 40 and the magnetic-head unit 20.

Figure 2:
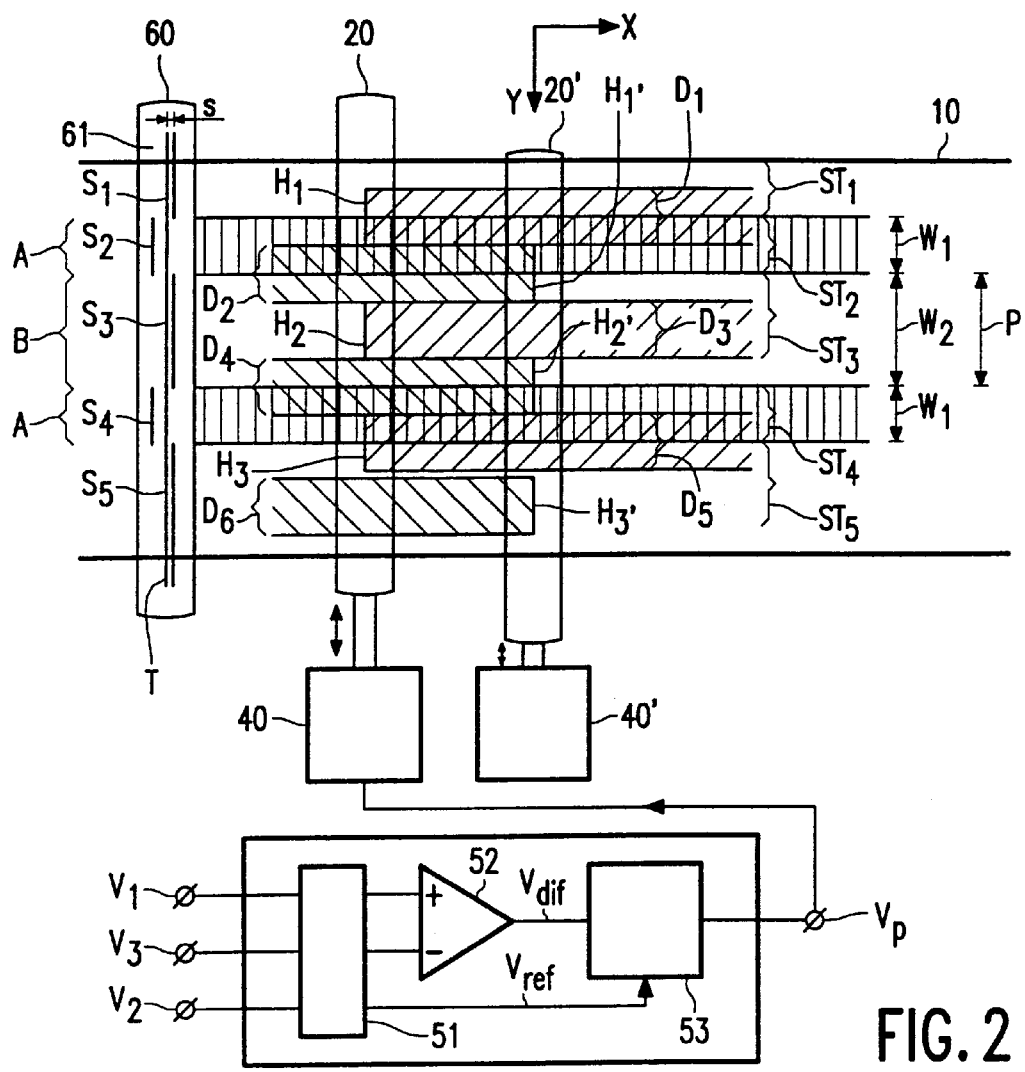

FIG. 2 diagrammatically shows the magnetizable medium in the form of the magnetic tape 10, a write head 60, the magnetic-head unit 20 and the actuator 40. The magnetic tape 10 has been provided with a pattern of servo tracks ST1–ST5 which extend in a longitudinal direction x and which adjoin one another in a transverse direction y which extends perpendicularly to the longitudinal direction x. The servo tracks ST1, ST3 and ST5 are of a first type containing a first servo signal Sa and the servo tracks ST2 and ST4 are of a second type containing a second servo signal Sb. The servo signals Sa and SB comprise a fundamental of the same frequency but are in phase opposition to one another (see FIG. 4). The servo signals Sa and Sb have been recorded by means of the write-head unit 60. The write-head unit 60 comprises a head face 61 with adjacent write heads S1–S5 having a common pole T. The write heads S1–S5 have a comparatively large gap length s, as a result of which the servo signals are written deep into the magnetic tape 10. Two write heads S2 and S4 of a group of write heads of a first type A are separated as if were by a write head S3 of a second type B. The write heads S2 and S4 of the first type A have a first typical width W1 and the write unit S3 of the second type B has a typical width W2=2.W1. The write-head unit 60 write the servo track pattern ST1–ST5 onto the magnetic tape 10 in a single pass. This writing is effected preferably when the magnetic tape is manufactured or when the magnetic tape 10 is wound into the cartridge 11 (see FIG. 1).

The magnetic-head unit 20 forms part of the apparatus 100 as shown in FIG. 1 and comprises three magnetic heads H1, H2 and H3 which can read and write simultaneously. The apparatus 100 as shown in FIG. 1 is adapted to write information signals in information tracks D1–D6. For positioning the magnetic-head unit 20 during writing and/or reading of the information tracks D1–D6 the apparatus 100 comprises an actuator 40 and a servo circuit 50. The servo circuit 50 is arranged between the magnetic-head unit 20 and the actuator 40 and is adapted to position the magnetic-head unit 20 with respect to servo track pattern ST1–ST5 in response to the servo signals V1, V2 and V3 read from the servo tracks by the heads H1, H2 and H3, respectively. The servo circuit 50 includes a selector 51 for selecting the signals from heads disposed at a transition line between two servo tracks and a comparator 52 for generating a difference signal Vdif from the selected signals. The selector 51 is controlled by the microcontroller 70 shown in FIG. 1. The servo circuit 40 further comprises a multiplier 53 for generating a position signal Vp as a function of the position y of the magnetic-head unit (see FIG. 3). The position signal Vp is generated by multiplying the difference signal Vdif by a reference signal Vref obtained from the head which wholly situated on one of the servo tracks. The actuator 40 is driven until the position signal Vp is substantially equal to zero. The reference signal Vref and the difference signal Vdif are formed as follows by the selector 51 depending on the pass:

| pass | Vref | Vdif |
|------|------|------|
| 1 | V2 | V1–V3 |
| 2 | V3 | V2–V1 |

The pitch p between the magnetic heads H1, H2 and H3 is equal to twice the typical width W1 of the servo tracks ST2 and ST4. As a result of this, two passes are needed two fill the magnetic tape 10 with information tracks D1–D6. In a first pass the magnetic-head unit 20 writes the information tracks D1, D3 and D5, the magnetic tape 10 being moved in the x direction with respect to the magnetic-head unit 20. In a second pass the same magnetic-head unit 20, now referenced 20', writes the information tracks D2, D4 and D5 at another position in the transverse direction y, the magnetic tape 10 being moved in a direction opposite to the x direction with respect to the magnetic-head unit 20'. After this second pass the magnetic tape 10 has returned to is initial position.

Figure 4:
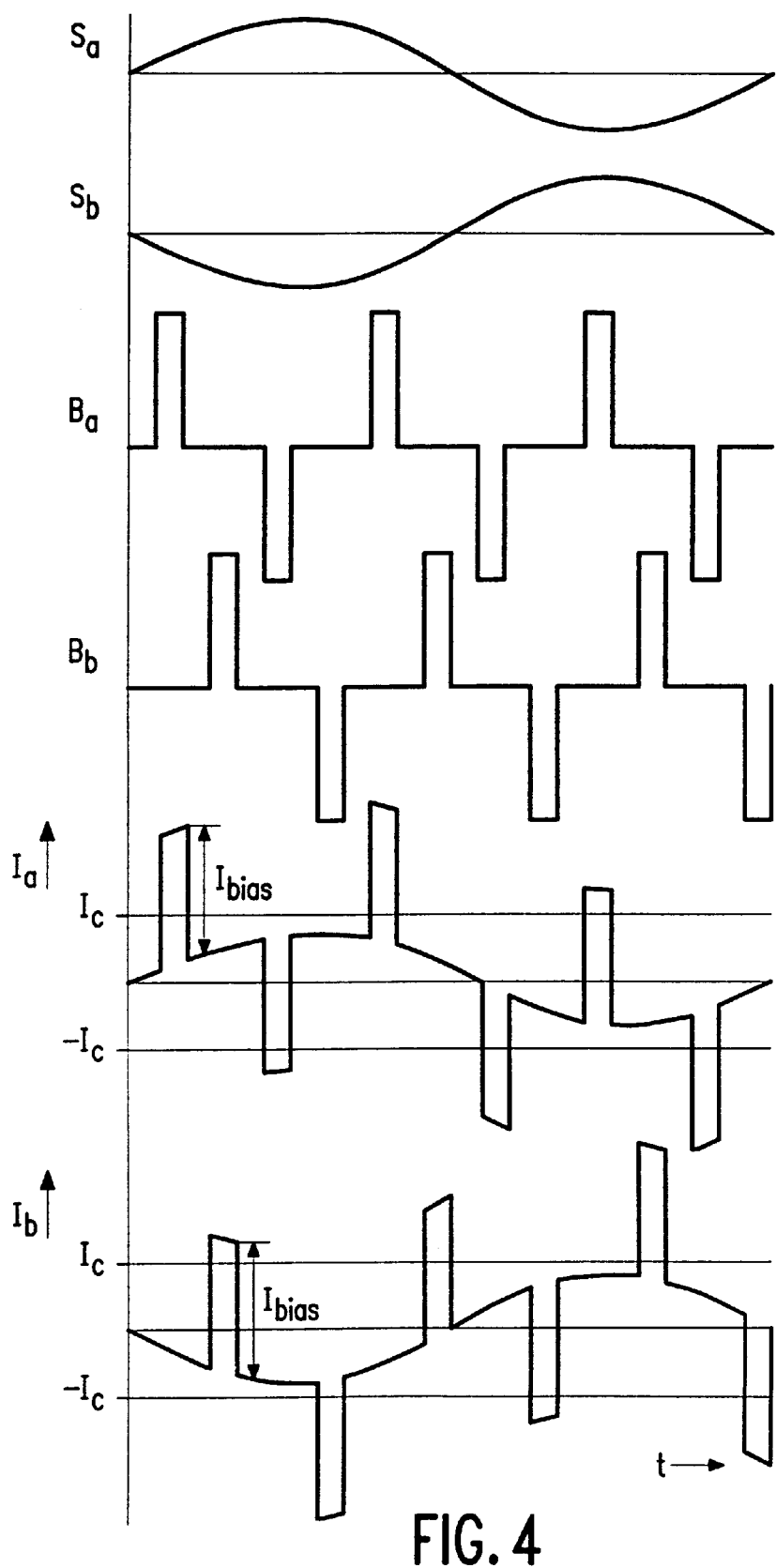
FIG. 4 shows a first servo signal Sa, a second servo signal Sb, a first bias signal Ba, a second bias signal Bb, a first write signal Ia and a second write signal Ib, and FIG. 5 diagrammatically shows an arrangement 200 for recording signals Sa and Sb on a magnetizable medium 10.

FIG. 4 shows the first servo signal Sa, the second servo signal Sb, a first bias signal Ba, a second bias signal Bb, a first write signal Ia and a second write signal Ib. When the servo tracks ST1–ST5 are recorded the write heads S1, S3 and S5 are driven with the first write signal Ia and the write heads S2 and S4 are driven with the second write signal Ib (see FIG. 2). The first write signal Ia is generated by adding the first servo signal Sa and the first bias signal Ba, and the second write signal Ib is generated by adding the second servo signal Sb and the second bias signal Bb. The first servo signal Sa comprises a first sinusoidal component and the second servo signal Sb comprises a second sinusoidal component. The frequency of the first sinusoidal component is equal to the frequency of the second sinusoidal component and the first sinusoidal component and the second sinusoidal component are in phase opposition.

The first bias signal Ba and the second bias signal Bb consist of a periodic trivalent signal and the first bias signal Ba is approximately 90° shifted in phase with respect to the second bias signal Bb. As a result of this, the absolute value of the second bias signal Bb is comparatively small when the absolute value of the first bias signal Ba is comparatively large, and the absolute value of the first bias signal Ba is comparatively small when the absolute value of the second bias signal Bb is comparatively large. Consequently, the absolute value of the second write signal Ib is comparatively small when the absolute value of the first write signal Ia is comparatively large, and the absolute value of the first write signal Ia is comparatively small when the absolute value of the second write signal Ib is comparatively large. The frequency of the bias signals Ba and Bb is three times as high as the frequency of the servo signals Sa and Sb and slightly higher than the Nyquist frequency of the magnetic tape 10. The amplitude of the bias signals Ba and Bb is at least three times and preferably ten times as high as the amplitude of the servo signals Sa and Sb (for practical reasons this ratio is shown differently in FIG. 4). Since the magnetic tape 10 has a certain coercivity the magnetic tape is not inscribed until the current Ia or Ib exceeds a given limit value IC or -Ic. Preferably, the amplitude Tbias of the pulses in the write currents Ia and IB as a result of the bias signals is at least three times as high as said limit value Ic. In the case of a smaller current than IC the field strength of the magnetic field produced by a magnetic head is smaller than the coercivity of the magnetic tape 10, as a result of which the magnetic tape 10 is not magnetized. By means of the write currents Ia and Ib as shown in FIG. 4 the magnetic tape 10 is alternately magnetized by the write heads S1, S3, S5 and the write heads S2, S4. Owing to the measures in accordance with the invention it is achieved that the signal Vp shown in FIG. 3 has a substantial slope, as a result of which the magnetic-head unit 20 is positioned accurately with respect to the magnetic tape.

Figure 3:
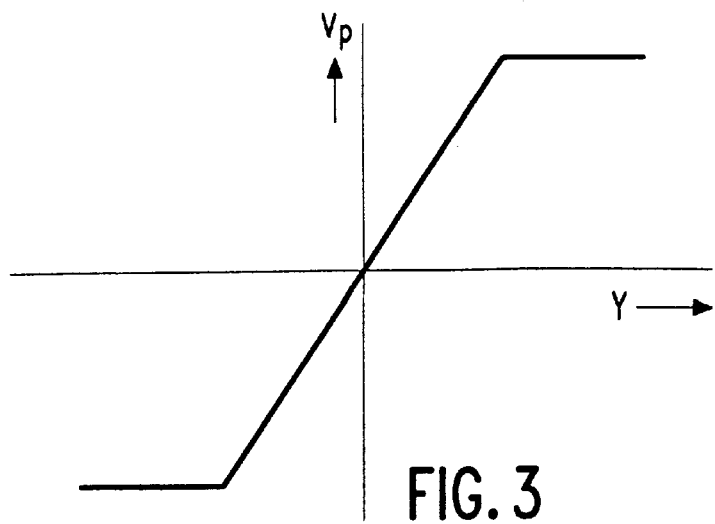
FIG. 3 shows a position signal Vp as a function of the position y of the magnetic-head unit 20 shown in FIG. 2.
Figure 5:
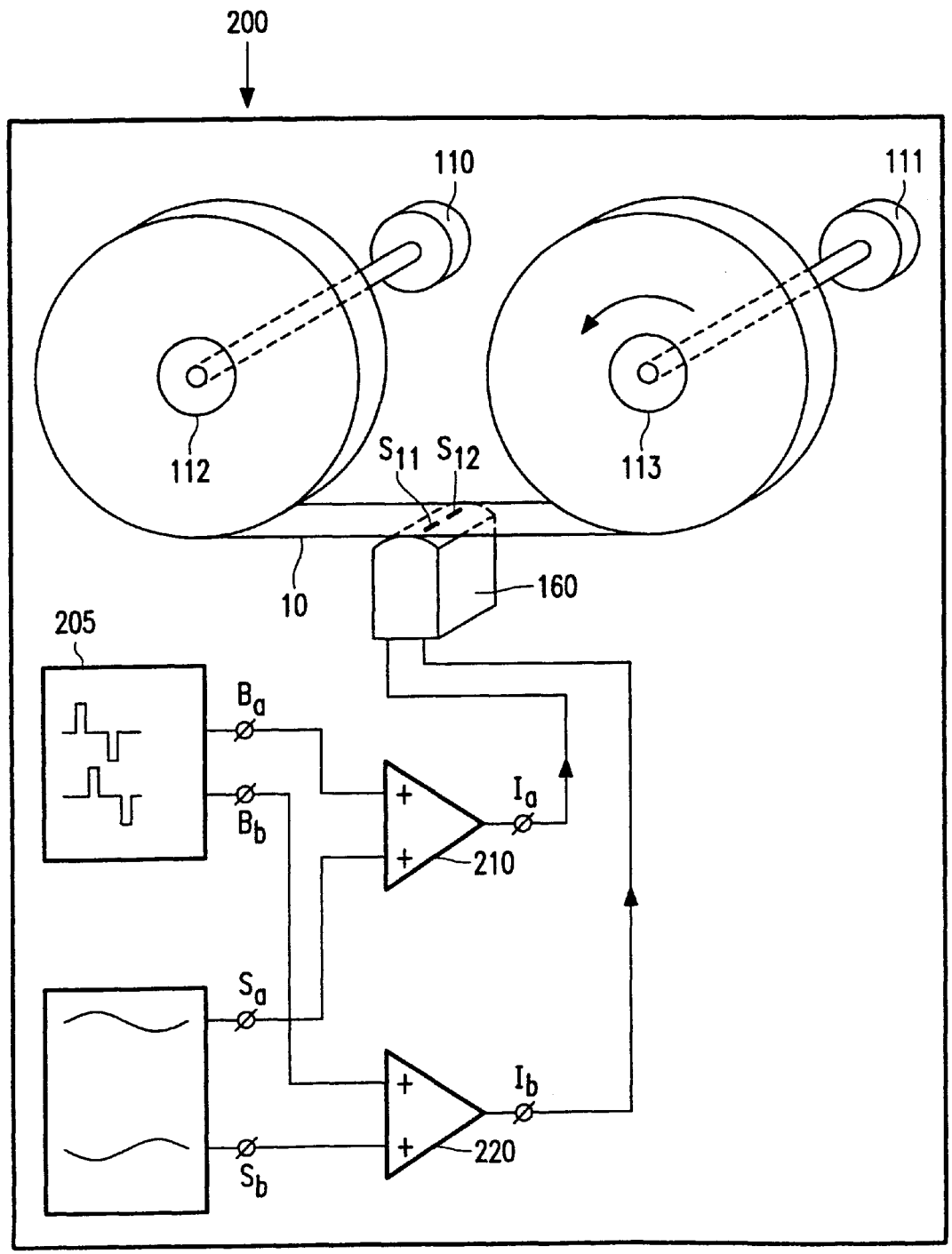

FIG. 5 diagrammatically shows an arrangement 200 for recording signals Sa and Sb on a magnetizable medium 10. The arrangement 200 comprises a write head unit 160 having at least a first write head S11 and a second write head S12 situated near the first write head S11. The arrangement 200 further has a mechanism comprising two electric motors 110, 111 and two reel hubs 112, 113 on which the medium 10 is wound. By means of this mechanism the medium 10 can be moved past the write head unit 1600. The arrangement 200 comprises a bias generator 205 for generating bias signals Ba and Bb as shown in FIG. 3 and adding means 210 and 220 for forming write signals Ia and Ib by adding the bias signals Ba and Bb to the signals Sa and Sb to be written onto the medium 10. The write heads S11 and S12 are driven with the write signals Ia and Ib, respectively. Owing to the relationship between the bias signals Ba and Bb as described with reference to FIG. 3 the medium 10 is alternately magnetized by the first write head S11 and the second write head S12.

It is to be noted that the invention is not limited to the examples shown herein. Several other variants are possible without departing from the scope of the invention. For example, instead of a magnetic tape a magnetic disc can be used. Moreover, the servo signals Sa and Sb can be signals of a different frequency, the servo circuit generating a position signal for controlling the actuator on the basis of the amplitude of the servo signals Sa and Sb as read by a number of heads. The signals Sa and Sb may also contain data instead of or in addition to said sinusoidal component. Furthermore, instead of a rectangular pulse shape the bias signals may have another, for example triangular, pulse shape, as a result of which the bias signal has more than three values.

What is claimed is:

1. A method of formatting a magnetizable medium, comprising the recording in one pass of at least a first servo signal in a first servo track by means of a first write head and a second servo signal in a second servo track, adjacent the first servo track, by means of a second write head, each of said first and second servo signals having a frequency, wherein during the pass the medium is magnetized alternately by the first write head and the second write head with a frequency of alternation which is higher than, or substantially equal to, the highest frequency in the first servo signal and the second servo signal.

2. A method as claimed in claim 1, characterized in that use is made of a frequency of alternation which is higher than, or substantially equal to, the Nyquist frequency of the medium.

3. A method as claimed in claim 1, characterized in that the first write head is driven with a first write signal comprising the first servo signal and a first bias signal, the second write head is driven with a second write signal comprising the second servo signal and a second bias signal, the absolute value of the second bias signal is comparatively small when the absolute value of the first bias signal is comparatively large, and the absolute value of the first bias signal being comparatively small when the absolute value of the second bias signal is comparatively large.

4. A method as claimed in claim 3, characterized in that the first bias signal and the second bias signal comprise a periodic trivalent signal, and the phase of the first bias signal is shifted approximately 90 degrees with respect to the phase of the second bias signal.

5. A method as claimed in claim 1, characterized in that use is made of a first servo signal comprising a first sinusoidal component and a second servo signal comprising a second sinusoidal component, the frequency of the first sinusoidal component being equal to the frequency of the second sinusoidal component, and the first sinusoidal component and the second sinusoidal component being in phase opposition.

6. A method as claimed in claim 1, characterized in that use is made of an arrangement in which the first write head and the second write head have a common pole.

7. A method as claimed in claim 1, characterized in that during the pass servo tracks ST1, ST2, . . . STn are recorded adjacent one another, the first servo signal being recorded in the odd-numbered servo tracks and the second servo signal being recorded in the even-numbered servo tracks.

8. An arrangement for formatting a magnetizable medium, comprising a write head unit comprising at least a first write head and a second write head disposed near the first write head, a mechanism for moving the medium and the write head unit with respect to one another, a servo generator for driving the first write head with a first servo signal and for driving the second write head with a second servo signal, wherein the arrangement comprises means for alternately magnetizing the medium with the first write head and the second write head during the movement of the medium and the write head with respect to one another, said means for alternately magnetizing the medium comprising a bias generator and adding means, the bias generator being adapted to generate a first bias signal and a second bias signal, the absolute value of the second bias signal being comparatively small when the absolute value of the first bias signal is comparatively large, and the absolute value of the first bias signal being comparatively small when the absolute value of the second bias signal is comparatively large, and the adding means being adapted to add the first bias signal to the first servo signal and to add the second bias signal to the second servo signal.

* * * * *